United States Patent [19]
Ramond

[11] 3,842,546

[45] Oct. 22, 1974

[54] METHOD OF RE-SHARPENING PINION TOOLS

[75] Inventor: Pierre A. Ramond, Billancourt, France

[73] Assignee: Regie Nationale des Usines Renault, Billancourt Hauts de Seine, France

[22] Filed: Feb. 6, 1973

[21] Appl. No.: 330,065

Related U.S. Application Data

[62] Division of Ser. No. 39,969, May 25, 1970, Pat. No. 3,720,989.

[30] Foreign Application Priority Data

June 16, 1969 France .............................. 69.19904

[52] U.S. Cl. ................................................ 51/288
[51] Int. Cl. .......................... B24b 1/00, B24b 3/12
[58] Field of Search ............................... 51/288, 287

[56] References Cited
UNITED STATES PATENTS

| | | | |
|---|---|---|---|
| 2,828,583 | 4/1958 | Carlsen | 51/288 X |
| 3,323,260 | 6/1967 | Oxford | 51/288 |
| 3,483,605 | 12/1969 | Fabish | 51/288 X |

*Primary Examiner*—Donald G. Kelly
*Attorney, Agent, or Firm*—Stevens, Davis, Miller & Mosher

[57] ABSTRACT

A method of re-sharpening pinion tools using a grinding wheel shaped as a pair of conical frustums having a common major base, and grinding the leading face of a tooth of the pinion tool with one of the conical faces of the wheel while the other conical face forms a continuous connecting face with the next tooth of the pinion tool, and the radius of the major base of the wheel being coincident with the radius of the pinion tool which passes through the apex of one of the edge angles of the tooth bottom of the pinion tool.

2 Claims, 7 Drawing Figures

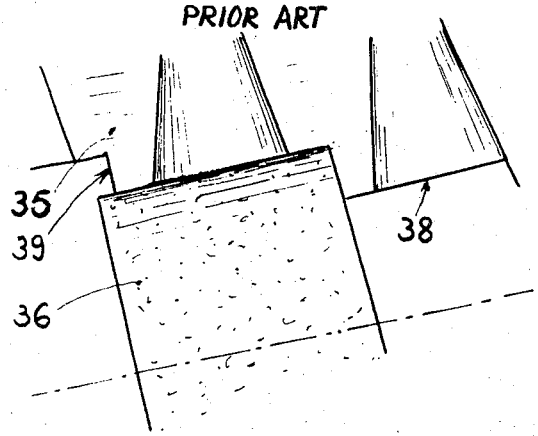
Fig. 2 PRIOR ART
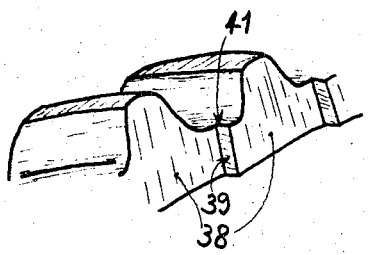
Fig. 3
Fig. 4
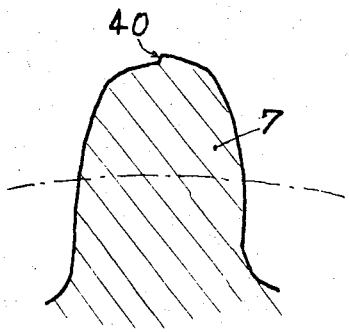
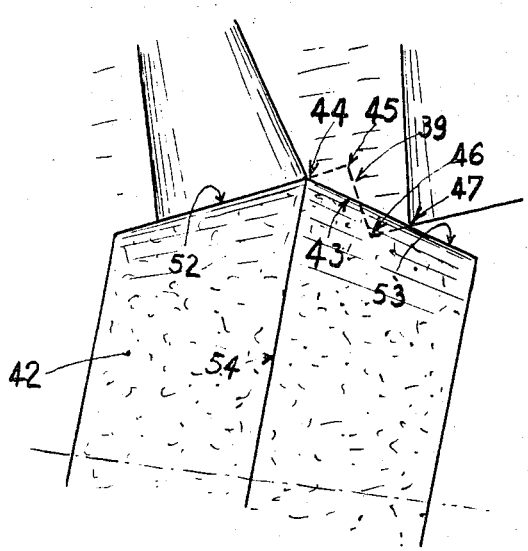
Fig. 5
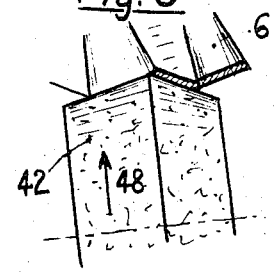
Fig. 6
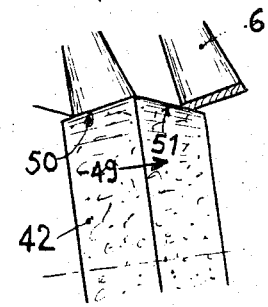
Fig. 7

METHOD OF RE-SHARPENING PINION TOOLS

The present invention relates to a method of re-sharpening pinion tools, and this application is a division of application Ser. No. 39,969, filed May 25, 1970, now U.S. Pat. No. 3,720,989.

The invention of the parent patent relates to the manufacture of teeth by cutting and more particularly to a method of cutting gear teeth by means of pinion-tools, i.e., pinion-shaped cutters, the method of that invention concerning likewise, from the initial choice of the desired tooth outline, the obtaining of a corresponding tool outline, the determination of the characteristics of the corresponding hob necessary for milling these pinion-shaped cutters and the manufacture of gears by using these means.

In contrast to conventional gear cutting processes utilizing pinion-tools, the cutting method of this invention cuts the teeth not only along their side faces but also their bottom and top surfaces. The pinion-tools are sharpened by means of grinding wheels having the shape of opposed double frustums of cones assembled by their major bases, thus ensuring a direct elimination of the connecting "steps" inherent to the sharpening operations carried out by means of cylindrical grinding wheels which are a source of irregular shapes and incipient ruptures at the top of the teeth in the case of workpieces and at the bottom of the teeth in the case of the pinion-tools.

The object of the present invention is a method of re-sharpening a pinion-tool wherein the leading face of a tooth of the pinion-tool is ground tangentially by one of the conically tapered side faces of the grinding wheel, while the other conically tapered side face of the grinding wheel forms a continuous connecting face with the next tooth throughout the width of the tooth bottom zone, the grinding wheel being so disposed that its central circular edge is coincident with the radius of one of the edge angles of the tooth bottom of the pinion-tool.

The pinion-tools are of the "integral" toothed type adapted to be used immediately after completing the milling operation, without any further grinding, notably of the teeth bottoms;

The number of permissible re-sharpening operations that can be performed on these pinion-tools is increased, due to the corrected-outline cutting thereof;

The manner in which the method may be carried out will appear more clearly as the following description proceeds with reference to the attached drawing, in which:

FIG. 2 shows the conventional sharpening operation applied to a pinion-tool by using a cylindrical hob or miller;

FIGS. 3 and 4 illustrate the "steps" thus formed on the teeth of the pinion-tool and workpiece;

FIG. 5 shows the sharpening operation carried out according to the method of this invention, and FIGS. 6 and 7 show by way of example two stages of the sharpening operation.

Figure 1:
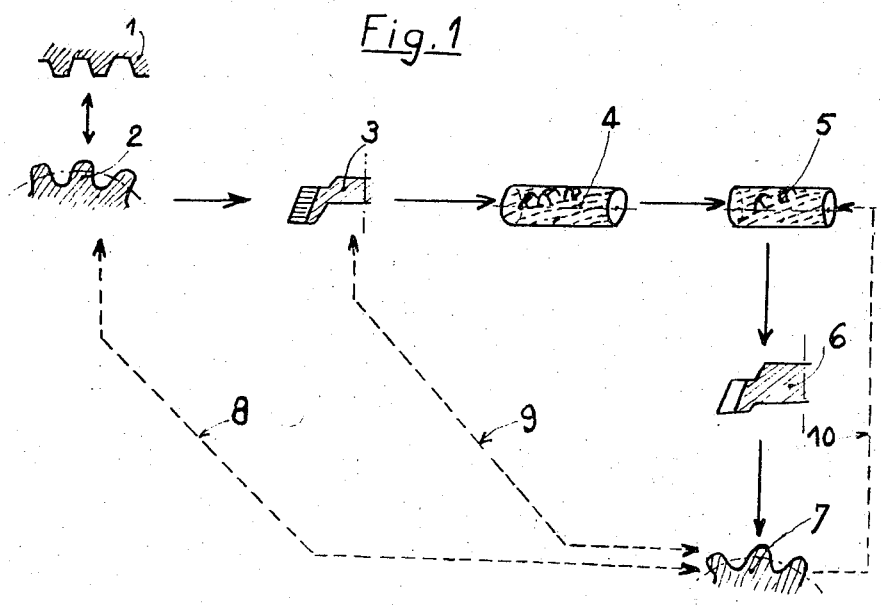
FIG. 1 is a general diagram summarizing the various steps of the method of this invention.

Referring first to the diagram of FIG. 1, the outlines 1 and 2 are those of the rack and of the workpiece, constituting a preliminary step and leading to the calculated theoretical pinion-tool 3 and then to the calculated theoretical hob 4 from which the simplified hob 5 is obtained which leads to the simplified pinion-tool 6 and then to the resultant pinion 7 from which comparisons 8 and 9 and a corrective action 10 may be exerted on the original workpiece 2, the pinion-tool 3 or the hob 5.

The cutting of the resultant workpieces 7 by means of the rough-milled pinion-tool 6 will necessitate of course a sharpening of the leading face of the teeth of this tool.

FIG. 2 shows the sharpening procedure of the prior art now currently used for these faces in the case of a pinion-tool 35 of known type. The use of a cylindrical grinding wheel 36 produces successive leading faces 38 (FIG. 3) connected through a shoulder 39 and forming a step 40 at the top of the teeth (FIG. 4), during the cutting operation, due to the corresponding step 41 formed at the bottom of the teeth of the pinion-tool.

FIG. 5 shows the sharpening method of this invention wherein the grinding wheel 42 is cut to constitute a double frustum of a cone, wherein the frustums are assembled by their major bases, and an outline as shown in this FIG. 5. As a result, the edge of the tooth bottom of pinion-tool 6, instead of forming a broken line 44, 45, 46, 47 has a straight line contour 43, 47, thus eliminating the resultant surface steps or shoulders 40, 41 on workpiece 7 and pinion-tool 6. FIG. 6 shows a first phase of the sharpening operation, wherein the grinding wheel is fed with a forward movement 48 followed (FIG. 7) by a lateral translation 49 parallel to the leading face 50.

One of the tapered side faces 52 of the grinding wheel operates tangentially to the leading face 38 of a tooth, the other tapered side face 53 of the grinding wheel constituting a continuous connecting face with the leading face of the adjacent tooth, across the width of the tooth bottom area.

The central circular edge or ridge 54 of the grinding wheel is coincident with a radius of the pinion-tool containing the apex 44 of one of the edge angles in the bottom of a tooth.

The tooth bottom edge 51 of pinion-tool 6 may be utilized directly for cutting the tops of the teeth of the workpiece pinions 7 according to the "integral" cutting process of this invention.

Without further analysis, the foregoing will so fully reveal the gist of the present invention that others can by applying current knowledge readily adapt it for the various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new is:

1. A method of re-sharpening pinion tools, comprising: grinding the pinion tool using a grinding wheel having the shape of a pair of conical frustums having a common major base, the leading face of a tooth of said pinion tool being ground with one of the conical faces of said wheel while the other conical face of said wheel forms a continuous connecting face with the next adjacent tooth of said pinion tool, and a radius of the major base of the wheel is linearly coincident with the radius of the pinion tool which passes through the apex of one of the edge angles of the tooth bottom of the pinion tool which is being ground.

2. The method of claim 1, wherein the angle between the two conical faces which meet at the common base of the wheel, and the edge angles of the tooth bottoms formed by said wheel, are obtuse angles.

* * * * *